March 28, 1961 H. E. WELCH 2,977,408

COLOR TELEVISION RECEIVER OF POST-DEFLECTION TYPE WITH AUXILIARY DEFLECTION

Filed May 13, 1957 2 Sheets-Sheet 1

INVENTOR.
Herbert E. Welch
BY
Smith, Olsen, Baird & Miller,
Attys.

INVENTOR.
Herbert E. Welch
BY
Smith, Olson, Baird & Miller
Attys.

Kind of document: United States Patent Office — 2,977,408 — Patented Mar. 28, 1961

1

2,977,408

COLOR TELEVISION RECEIVER OF POST-DEFLECTION TYPE WITH AUXILIARY DEFLECTION

Herbert E. Welch, 4601 43rd St., Lubbock, Tex.

Filed May 13, 1957, Ser. No. 658,717

9 Claims. (Cl. 178—5.4)

The present invention relates to a single-gun color picture tube of the type having a target screen made up of a plurality of vertically arranged color phosphor strips, and particularly to an improved method of and apparatus for deflecting the electron beam into an exact registry with the different color strips during each horizontal line scan.

The television signal, broadcast from a color television transmitter includes three simultaneous color signals representing, respectively, the red color component, the green color component and the blue color component of a color picture element. In a receiver provided with a single-gun color picture tube it is necessary that these three color signals be sampled one at a time and combined in a sequence to produce a single video signal which is applied to the electron gun of the color picture tube for modulating the electron beam by varying the electron density thereof in accordance with the color picture information. Where the target of the color picture tube is made up of vertical phosphor strips of red, green and blue colors, the different color phosphor strips must be arranged on the target so that as the beam scans the target in a horizontal line raster the different color modulated portions of the beam are directed to and register on phosphor strips of the corresponding color in order to produce a composite color picture. In the simplest target arrangment the red, green and blue phosphor strips are arranged on the target in the same sequence as that sequence in which the three color signals are sampled, combined and applied to the electron gun.

It has been determined that to prevent the color dots produced at the color strips by the beam from being individually visible to the eye and to provide adequate picture definition, the number of vertical phosphor strips on the target must be in excess of 350. With such a large number of strips, difficulty is experienced in properly deflecting the electron beam to achieve accurate registry on the appropriate color strips and in sustaining the registry, or controlling the beam to "dwell," on each color strip in order to fully utilize the color information modulated on the beam for exciting the color strip to full phosphorescence.

It is an object of the present invention to provide an improved method of and apparatus for deflecting the electron beam in a color television display tube of the type described.

A further object of the invention is to provide in a single-gun color television tube of the type described, a color switching arrangement for improving the accuracy of the color registry therein and the effective brightness of the picture to near the theoretical maximum while minimizing the switching power requirements and the radiation problems resulting therefrom.

A more specific object of the invention is to provide in a single-gun color television tube including a vertical phosphor-strip target and the conventional horizontal and vertical deflection arrangements producing a horizontal line raster, an improved color deflection arrangement including a horizontal color deflector located in the scanning section of the tube immediate to the electron gun and controlled by a saw-tooth voltage for which the slope is negative with regards to the conventional horizontal deflection voltage and which is repeated during each color pulse modulation interval of said electron beam so that the electron beam is caused to be directed approximately towards the axial center portion of each intersected color phosphor strip, and including a color switching grid immediate to the electron gun target which is controlled by a sine wave voltage for reversing the polarity between adjacent wires of the grid at a rate so as to cause the electron beam to be further deflected and directed on to the axial center portion of each color phosphor strip.

The advantages of this arrangement are that the color deflection of the electron beam may be accurately controlled and the beam may be caused to dwell, or be held in sustained registry, on a particular phosphor for the total duration of the color information pulse, whereby for a given electron beam density the brightness of the picture display is increased. A further advantage is that by carrying out an approximating color deflection in the scanning section of the tube and a final directory color deflection at the target, the total power required for color deflection is made relatively small and the radiation effects are made insignificant. Additionally, as deflection in the scanning section requires lower potentials than does deflection at the wire grid, it is believed that the total power requirement of this arrangement is substantially less and the accuracy of color registry is substantially greater than in other color switching arrangements proposed for color picture tubes of this type.

A further advantage of this arrangement is that by causing the electron beam to be directed onto the axial center portion of each color strip and to dwell thereon for the duration of the color pulse interval, it is possible to employ color phosphor strips of a width not substantially greater than the spot size of the electron beam whereby a greater number of color strips may be employed and a greater degree of color definition can be achieved than have been possible heretofore in color picture display tubes of this type.

Further features of the invention pertain to the particular arrangement of the circuit elements of the cathode ray tube arrangement, whereby the above outlined and additional operating features thereof are attained.

The invention, both as to its organization and methods of operation, together with further objects and advantages thereof, will be best understood by reference to the following specification taken in conjunction with the accompanying drawings, in which.

Figure 1:
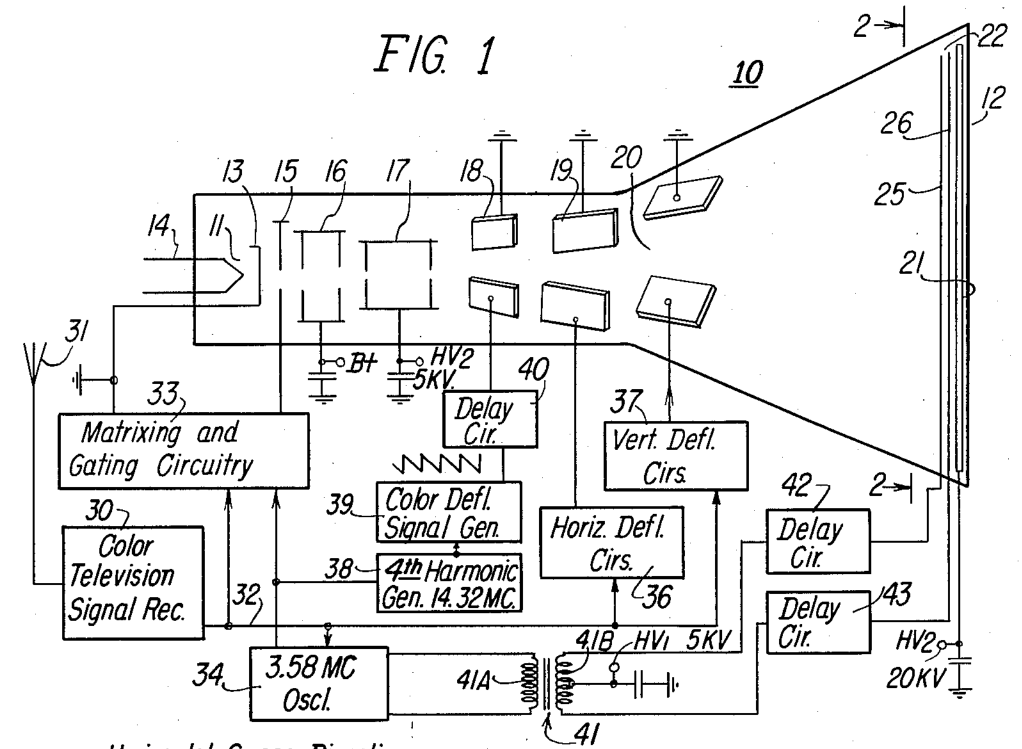
Figure 1 is a diagrammatic representation of a single-gun color picture tube and the operating circuits therefor embodying the principles of the present invention.

Referring to the drawings and considering first the arrangement of Fig. 1, there is shown a cathode ray tube 10 having an electron beam source 11 at one extremity thereof and a viewing area 12 at the other extremity thereof. The electron beam source or gun 11 comprises a thermo-emissive cathode 13 provided with a filament heater 14 surrounded by a grid or control electrode 15 for modulating the stream of electrons emitted by the cathode. Positioned immediate to the control electrode 15 is a first anode 16 for providing a preliminary acceleration to the electron beam, and adjacent thereto is a second anode 17 for focusing the beam and for providing a final acceleration to the electron beam.

Immediately in front of the second anode is positioned a pair of horizontal color-deflection plates, 18 the diagram of Fig. 1 being considered as viewed from the side. Beyond the set of color deflection plates 18 is a set of horizontal deflection plates 19 effective for producing the horizontal line scan of the electron beam on the target, and beyond the plates 19 is a set of vertical deflection plates 20, in quadrature to the plates 19, which is effective to produce the vertical scanning deflection of the electron beam. It is understood that the sets of electrostatic deflection plates 18, 19 and 20 are merely representative of means for producing deflections of the electron beam and that magnetic deflection coils may be utilized for producing the same deflections.

Figure 2:
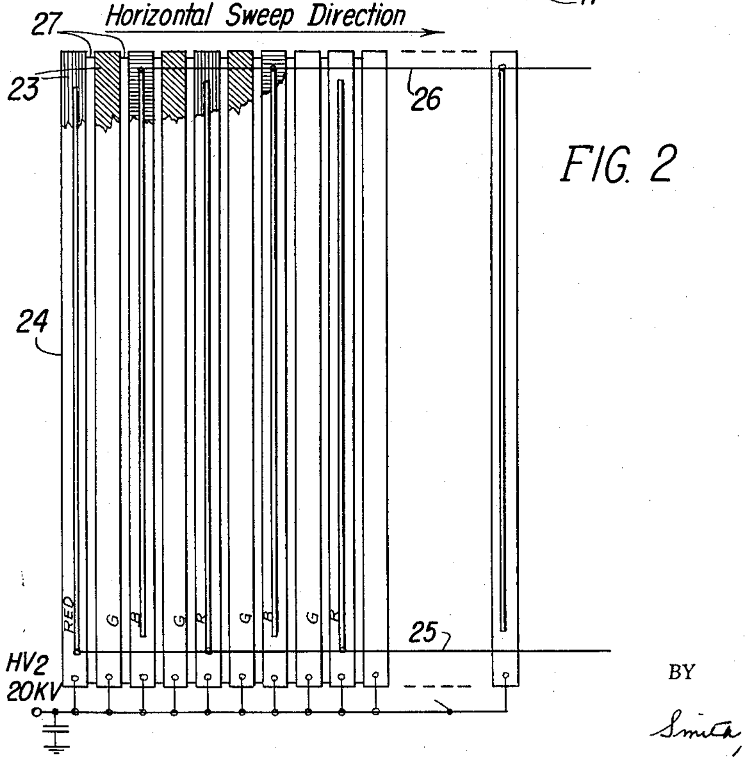
Fig. 2 is a plan view of the phosphor-strip target screen and the color grid arrangement therefor taken along the lines 2—2 of Fig. 1.

In the viewing area 12 and positioned to be impinged by the electron beam is a target electrode 21, and closely spaced therefrom in the electron beam path is a color grid 22. The target electrode 21 consists of a plurality of phosphor strips 23 deposited side-by-side on a thin plate of glass or other transparent material. As best shown in Fig. 2, the phosphor strips are respectively red, green and blue color phosphor strips and are laid down in a vertical pattern and in a repeated color-sequence, such, for example, as a reversing color-sequence with a green color strip between each red and blue color strip. Each complete sequence of color strips, that is, each set of red, green, blue, green color strips, comprises one picture element of the composite color picture and a sufficient number of such sets must be provided to secure adequate resolution in the reproduced color picture. It is considered that adequate resolution is achieved if the color information is reproduced on the viewing area at the 3.58 megacycle frequency and in the present arrangement this condition is substantially fulfilled when 227 of such sets of vertical phosphor strips are arranged on the target electrode 21. On the target electrode the phosphor strips may be closely spaced apart, one from another, by spacers 27 which may be made to vary in width in order to compensate for changes in focusing resulting from changes in the scanning angle of the electron beam.

In order to make the entire target area conductive so that it may be maintained at a uniform potential irrespective of the electrical charges thereon, the exposed surfaces of the phosphor strips are coated with a layer 24 of conductive material, such as aluminum.

The color switching grid 22 is made up of two interlaced sets of grid wires which are parallel to one another and are parallel to the phosphor strips 23 on the target 21. Specifically, one set of grid wires 25 is made up of wires which are parallel to and aligned with the "red" phosphor strips on the target 21, and the other set of grid wires 26 is parallel to and aligned with the "blue" phosphor strips on the target 21. The distance separating the grid wires from the phosphor strips of the target electrode 21 is determined by the accelerating potentials, the color switching deflection potentials, and the average potential difference between the grid wires and the coating 24 on the surfaces of the phosphor strips.

Considering now the manner in which elements of the cathode ray tube are connected in an operating circuit and referring specifically to Fig. 1, a television signal receiver 30 receives a complete color television signal from an antenna 31 and applies the video portion thereof to a conductor 32 which conductor extends to a number of circuits including a matrixing and gating circuit 33, a 3.58 megacycle oscillator 34, a horizontal deflection circuit 36 and a vertical deflection circuit 37. Specifically, the color sub-carrier "burst" included in the video signal, which is a 3.58 megacycle signal, is tapped from the conductor 32 to synchronize and drive the oscillator 34 at the 3.58 megacycle frequency; the 15,750 cycle horizontal synchronizing signal included in the video signal is tapped from the conductor 32 to synchronize and drive the horizontal deflection circuit 36; and the 60 cycle vertical synchronizing pulses included in the video signal are tapped from the conductor 32 to synchronize and drive the vertical deflection circuit 37. By means of the horizontal and vertical deflection circuits 36 and 37 the respectively associated horizontal and vertical deflection plates 19 and 20 are driven so that the electron beam emitted from the source 11 is deflected over the surface of the electron target 21 to produce 525 interlaced line traces per frame and 30 of such frames per second.

The matrix and gating circuitry 33 taps the three color information signals from the conductor 32, samples these signals and gates the sampled signals, under control of the 3.58 megacycle oscillator 34, to the control grid 15 in the repeated reversing color-sequence to modulate the electron beam with red and blue color information at the 3.58 megacycle frequency and with the green color information at a 7.16 megacycle frequency. In addition, the 3.58 megacycle oscillator 34 applies the color sub-carrier frequency signal to drive a fourth harmonic generator 38. The 14.32 megacycle signal from the second harmonic generator 38 is applied to a color deflection signal generator 39 wherein the signal is rectified and shaped into a saw-tooth wave of a 14.32 megacycle frequency in which the linear portion of the wave is of the same slope but negative with regards to the slope of the saw-tooth wave provided from the horizontal deflection circuit 36. The wave so generated in the color deflection signal generator 39 is applied through a delay circuit 40 to the color deflection plates 18.

The 3.58 megacycle signal from the oscillator 34 is applied also to a resonant circuit for driving the sets of grid wires 25 and 26 of the color switching grid 22. The resonant circuit includes an inductor 41B which is the secondary winding of a transformer 41. The inductor 41B is center tapped to a high voltage of approximately 5 kilovolts and is driven at the 3.58 megacycle frequency from the oscillator 34 through the primary winding 41A of the transformer 41. The set of grid wires 25 is connected through a delay circuit 42 to one terminal of the winding 41B and the other set of grid wires 26 is connected through a delay circuit 43 to the other terminal of the winding 41B.

The delay circuits 40, 42, and 43 are provided to compensate for the transit time of the color modulated portions of the electron beam from the control grid 15 respectively to the color deflection plates 18 and to the color switching grid 22, thereby to synchronize the color deflection potentials at the color deflection plates 18 and the color switching potentials at the color switching grid 22 to the individual color modulated portions of the electron beam.

Figures 3A, 3B, 3C, 3D, 3E, 3F:
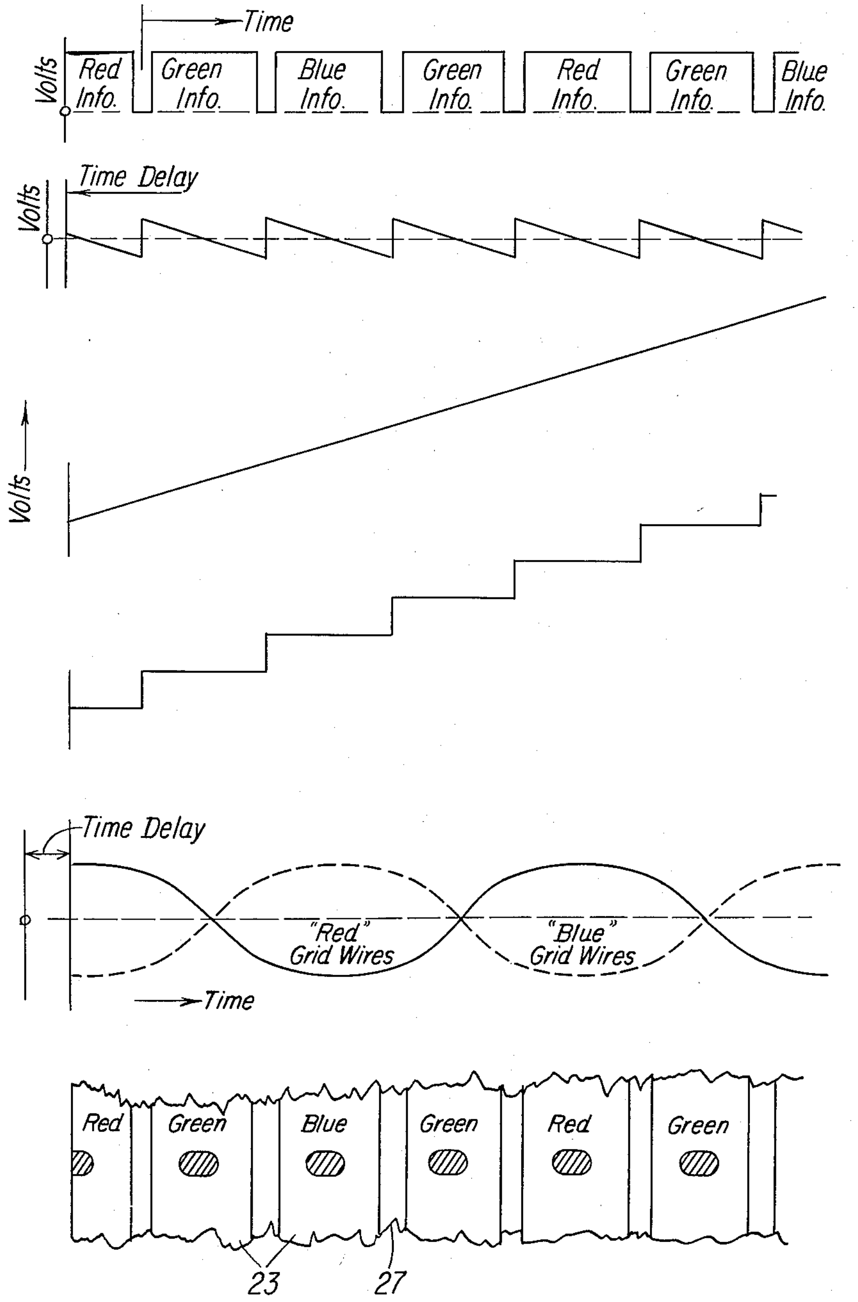
Figs. 3A to 3F, inclusive, show the various voltages effective upon the electron beam during a portion of one horizontal line scan and the corresponding trace pattern produced on the electron target.

Considering now the operation of the arrangement shown in Fig. 1, in deflecting a color modulated electron beam to produce a color display on the viewing area 12 of the cathode ray tube 10, as pointed out above the electron beam is color modulated at the control grid 15 at the 14.32 megacycle rate so that the electron beam is segmented into bursts of color information signals in the sequence of red, green, blue, green, red, green, etc., as shown in Fig. 3A. During the course of travel of these segmented bursts from the control grid 15 to the target electrode 21 it is necessary to deflect the beam of electrons so that the respective color information bursts thereof are directed to and are accurately registered on the corresponding color strips arranged in the same sequence on the target electrode.

In order to accomplish this deflection operation, there is applied to the non-grounded plate of the horizontal color deflection plates 18 through the delay circuit 40, a negative slope saw-tooth wave voltage as shown in Fig.

3B having a period corresponding to that of each color information burst and a frequency of 14.32 megacycles, corresponding to the rate at which the color information bursts are applied to the electron beam. The rate at which the linear portion of the color deflection voltage proceeds from a positive voltage to a negative voltage is identical to that rate at which the horizontal deflection voltage, shown in Fig. 3C, proceeds from a negative to a positive voltage. The latter voltage is applied to the non-grounded plate of the horizontal deflection plates 19. The composite effect of the voltages applied to the horizontal color deflection plates 18 and the horizontal deflection plates 19 is as if a stair-step voltage, as shown in Fig. 3D, were applied to deflect the electron beam. Accordingly, the color bursts of the electron beam are deflected upon passage between the sets of plates 18 and 19 so as to be directed approximately toward the corresponding color strips, whereby a red information color burst is directed approximately toward a red strip, the following green color information bursts is directed approximately toward the next adjacent green strip, and the following blue color information burst is directed approximately toward the next adjacent blue strip, etc., during each horizontal line scan. Thereafter the color bursts of electrons are accelerated toward the target electrode 21 into proximity with the sets of grid wires 25 and 26 of the color switching grid 22 where the color bursts of electrons are further deflected and directed towards the axial center portion of the corresponding color strip.

Specifically, the "red" color grid wires 25 and the "blue" color grid wires 26 of the color switching grid 22 are driven from a positive voltage to a negative voltage cyclically in a sine wave mode and 180° out of phase with one another and in synchronism with the color information bursts intercepted by the cloor switching grid 22. The potentials on the set of grid wires 25 and on the set of grid wires 26 are controlled with regard to one another and with regard to the conductive coatings 24 on the target electrode 21 so that when a red information color burst of electrons is intercepted by the color switching grid 22, the "red" grid wires 25 are positive with respect to the "blue" grid wires 26, as shown in Figs. 3E and 3F, and the conductive coating 24 is positive with respect to the "red" grid wires 25. Accordingly, an electric field is established between the color switching grid 22 and the target electrode 21 so that the intercepted red information color burst of electrons, which is directed approximately toward a particular one of the red phosphor strips, is further deflected, focused, and directed on to the axial center portion of the particular red phosphor strip. Similarly, when the color switching grid 22 intercepts a green information color burst of electrons, the set of grid wires 25 is at the same potential as the set of grid wires 26 and the conductive coating 24 on the target electrode 21 is positive with respect to the sets of grid wires 25 and 26 so that there is produced as between the color switching grids 22 and the target electrode 21 an electric field whereby the green information color burst of electrons, which is directed approximately toward one of the green phosphor strips, is further deflected, focused, and directed onto the axial center portion of the one green phosphor strip. Similarly, when the color switching grid 22 intercepts a blue information color burst of electrons, the "blue" grid wires 26 are positive with respect to the "red" grid wires 25 and the conductive coatings 24 on the target electrode 21 are positive with respect to the "blue" grid wires 26 so that there is established as between the color switching grid 22 and the electrode 21 an electric field whereby the intercepted blue information color burst of electrons, which is directed approximately toward one of the blue phosphor strips, is further deflected, focused, and directed onto the axial center portion of the one blue phosphor strip. Accordingly, color deflection of the electron beam is controlled conjointly by the negative slope saw-tooth wave applied to the color deflection plates 18, the positive slope horizontal scanning saw-tooth wave applied to the horizontal deflection plates 19 and the sine wave voltages applied to the color grids 22, so that the electron beam dwells on the axial center portion of a phosphor strip during the interval of a corresponding color burst and at the end of that interval the electron beam is progressed immediately to the axial center portion of the next adjacent color strip to dwell thereon during the interval of the corresponding color information burst. In this manner the electron beam is stepped consecutively from color strip to color strip in the horizontal direction across the electron target during the interval of one horizontal line scan, and, under control of the vertical deflection voltage applied to the vertical deflection plates 20, the horizontal line scan is repeated a plurality of times over the area of the target electrode 21.

It may be appreciated from a consideration of Fig. 3F, that the green color information is applied to the electron target twice as often as either the red or the blue color information during each horizontal line scan and that without equalization the green color would predominate in a reproduced color picture. A balance may be achieved between brightness of the color strips, in any number of ways including controlling the electron gun source arrangement so that the green information color bursts are either of a shorter duration or of a lower electron density than the red and blue information color bursts, or by making the green phosphors less flourescent by the dilution thereof with an inert substance.

It is understood that the foregoing example is merely illustrative of the principles of the invention and that many variations may be made in the illustration without disturbing the principles of the invention. Specifically, the sequence in which the electron beam is modulated by the different color information pulses and the sequence in which the different color phosphor strips are arranged on the target may be varied and need not be the same sequences, it being contemplated that the normal horizontal line scanning deflection of the electron beam can be modified by a color deflection voltage that is different in period and frequency from that employed in the illustration in order to cause the electron beam to skip or pass over certain ones of the phosphor strips during each horizontal line scan. Further, it is contemplated that numbers of color phosphor strips sets different from that chosen for the illustration may be employed, in which case the frequencies at which the color grid wires and the color deflection plates are driven must be changed accordingly.

It is emphasized that the embodiment described herein is illustrative of the improved method of and arrangement for deflecting the electron beam of a single-gun color television display tube having vertically arranged color phosphor strips on the electron target thereof wherein the electron beam is subject to the conventional horizontal and vertical deflection voltages and wherein the electron beam, in accordance with the invention, is subjected to a low power pre-acceleration color deflection in the horizontal dimension which causes each color modulated portion of the electron beam to be directed approximately toward the axial center portion of the corresponding strip and is subjected to a low power post-acceleration color deflection in the horizontal dimension which causes the beam to be further deflected, focused, and directed onto the corresponding color strip at the axial center portion thereof to dwell thereon for the duration of the color pulse interval. Others skilled in the art may devise modifications and improvements of this arrangement, and it is intended to cover in the appended claims all such modifications and improvements as fall within the true spirit and scope of the invention.

What is claimed is:

1. In a dot-sequential color television system including a picture display tube provided with an electron gun for emitting a beam of electrons, a picture display area composed of an electron target made up of a plurality of vertically disposed phosphor strips including strips of a first color and of a second color and of a third color arranged in a repeated color-sequence, first means for deflecting the beam selectively horizontally and vertically to scan the target in a horizontal line raster wherein the electron beam traverses the target and each phosphor strip thereof at a linear rate during each line scan, and means for modulating the electron beam with first color information pulses and second color information pulses and third color information pulses in a repeated color-sequence and in synchronism with the traversal by the beam of the corresponding color strips; the combination comprising, second means for deflecting the electron beam separate and distinct from said first deflecting means and effective upon the electron beam during the interval of each of the color information pulses in opposition to the horizontal scanning deflection of the beam during the interval in order to cause the electron beam to be directed approximately toward the axial center portion of each of the color strips during the corresponding color pulse intervals, a color grid disposed in the electron beam path adjacent to the electron target and including first color grid wires in parallel alignment with the first color strips and third color grid wires in parallel alignment with the third color strips, and a voltage generator for biasing said first color grid wires positive with respect to said third color grid wires during the intervals the electron beam is directed approximately toward the axial center portion of one of the first color strips and for biasing said third color grid wires positive with respect to said first color grid wires during the intervals the electron beam is directed approximately toward the axial center portion of one of the third color strips in order to cause the electron beam to be further deflected and accurately directed onto the axial center portion of a first color strip and of a second color strip and of a third color strip of the electron target respectively during the corresponding color pulse intervals thereof, whereby the first color and the second color and the third color modulated portions of the electron beam dwell and accurately register at the axial center portion respectively of a first color strip and of a second color strip and of a third color strip of the electron target to produce in composite an intense color picture display.

2. In a dot-sequential color television system, including a picture display tube provided with an electron gun for emitting a beam of electrons, a picture display area composed of an electron target made up of a plurality of vertically disposed phosphor strips including strips of a first color and of a second color and of a third color arranged in a repeated color-sequence, first means for deflecting the beam selectively horizontally and vertically to scan the target in a horizontal line raster wherein the electron beam traverses the target and each phosphor strip thereof at a linear rate during each line scan, and means for modulating the electron beam with first color information pulses and second color information pulses and third color information pulses in the repeated color-sequence and in synchronism with the traversal by the beam of the corresponding color strips; the combination comprising, second means for deflecting the electron beam separate and distinct from said first deflecting means and disposed closely adjacent to the electron gun, a color grid disposed in the electron beam path closely spaced from the electron target and including first color grid wires in parallel alignment with the first color strips and third color grid wires in parallel alignment with the third color strips, a first voltage generator effective during the interval of each of the color information pulses for energizing said second deflecting means to deflect the electron beam in opposition to the horizontal scanning deflection of the beam and at the same rate in order to cause the electron beam to be directed approximately toward the axial center portion of each of said color strips, and a second voltage generator for biasing said first color grid wires positive with respect to said third color grid wires during the intervals the electron beam is directed approximately toward the axial center portion of one of the first color strips and for biasing said third color grid wires positive with respect to said first color grid wires during the intervals the electron beam is directed approximately toward the axial center portion of one of the third color strips in order to cause the electron beam to be further deflected and accurately directed onto the axial center portion of a first color strip and of a second color strip and of a third color strip of the electron target respectively during the corresponding color pulse intervals thereof, whereby the first color and the second color and the third color modulated portions of the electron beam dwell and accurately register at the axial center portion respectively of a first color strip and of a second color strip and of a third color strip on the electron target to produce in composite an intense color picture display.

3. In a dot-sequential color television system including a picture display tube provided with an electron gun for emitting a beam of electrons, a picture display area composed of an electron target biased with respect to the electron gun for attracting the electrons emitted therefrom and made up of a plurality of vertically disposed phosphor strips including strips of a first color and of a second color and of a third color arranged in a repeated color-sequence, first means for deflecting the beam selectively horizontally and vertically to scan the target in a horizontal line raster wherein the electron beam traverses the target and each phosphor strip thereof at a linear rate during each line scan, and means for modulating the electron beam with first color information pulses and second color information pulses and third color information pulses in the repeated color-sequence and in synchronism with the traversal by the beam of the corresponding color strips; the combination comprising, second means for deflecting the electron beam separate and distinct from said first deflecting means and disposed closely adjacent to the electron gun, a color grid disposed in the electron beam path closely spaced from the electron target and biased intermediate with regard to the electron gun and the electron target and including first color grid wires in parallel alignment with the first color strips and third color grid wires in parallel alignment with the third color strips, a first voltage generator effective during the interval of each of the color information pulses for energizing said second deflecting means to deflect the electron beam in opposition to the horizontal scanning deflection of the beam and at the same rate in order to cause the electron beam to be directed approximately toward the axial center portion of each of the color strips, and a second voltage generator for biasing said first color grid wires positive with respect to said third color grid wires during the intervals the electron beam is directed approximately toward the axial center portion of one of the first color strips and for biasing said third color grid wires positive with respect to said first color grid wires during the intervals the electron beam is directed approximately toward the axial center portion of one of the third color strips in order to cause the electron beam to be further deflected and accurately focused onto the axial center portion of a first color strip and of a second color strip and of a third color strip of the electron target respectively during the corresponding color pulse intervals thereof, whereby the first color and the second color and the third color modulated portions of the electron beam dwell and accurately register at the axial center portion respectively of a first color strip and of a second color strip and of a third color strip on the electron target to produce in composite an intense color picture display.

4. In a dot-sequential color television system including a picture display tube provided with an electron gun for emitting a beam of electrons, a picture display area composed of an electron target biased with respect to the electron gun for attracting the electrons emitted therefrom and made up of a plurality of vertically disposed phosphor strips including strips of a first color and of a second color and of a third color arranged in a reversing color-sequence, first means for deflecting the beam selectively horizontally and vertically to scan the target in a horizontal line raster wherein the electron beam traverses the target and each phosphor strip thereof at a linear rate during each line scan, and means for modulating the electron beam with first color information pulses and second color information pulses and third color information pulses in the reversing color-sequence and in synchronism with the traversal by the beam of the corresponding color strips; the combination comprising, second means for deflecting the electron beam separate and distinct from said first deflecting means and disposed closely adjacent to the electron gun, a color grid disposed in the electron beam path closely spaced from the electron target and biased intermediate with regard to the electron gun and the electron target and including first color grid wires in parallel alignment with the first color strips and third color grid wires in parallel alignment with the third color strips, a sawtooth wave generator effective during the interval of each of the color information pulses for energizing said second deflecting means to deflect the electron beam in opposition to the horizontal scanning deflection of the beam and at the same rate in order to cause the electron beam to be directed approximately toward the axial center portion of each of the color strips, and a sine wave voltage generator biasing said first color grid wires positive with respect to said third color grid wires during the intervals the electron beam is directed approximately toward the axial center portion of one of the first color strips, and biasing said first and third color grid wires at substantially the same potential during the intervals the electron beam is directed approximately toward the axial center portion of one of the second color strips and biasing said third color grid wires positive with respect to said first color grid wires during the intervals the electron beam is directed approximately toward the axial center portion of one of the third color strips in order to cause the electron beam to be further deflected and accurately focused onto the axial center portion of a first color strip and of a second color strip and of a third color strip of the electron target respectively during the corresponding color pulse intervals thereof, whereby the first color and the second color and the third color modulated portions of the electron beam dwell and accurately register at the axial center portion respectively of a first color strip and of a second color strip and of a third color strip on the electron target to produce in composite an intense color picture display.

5. In a dot-sequential color television system including a picture display tube provided with an electron gun for emitting a beam of electrons, a picture display area composed of an electron target biased highly positive with respect to the electron gun for accelerating thereto the electrons emitted from the gun and made up of a plurality of vertically disposed red phosphor strips and green phosphor strips and blue phosphor strips arranged side-by-side in a reversing color-sequence, first means for deflecting the beam selectively horizontally and vertically to scan the target in a horizontal line raster wherein the electron beam traverses the target and each phosphor strip thereof at a linear rate during each line scan, and means for modulating the electron beam with red color information pulses and green color information pulses and blue color information pulses in the reversing color-sequence and in synchronism with the traversal by the beam of the corresponding color strips; the combination comprising, second means for deflecting the electron beam separate and distinct from said first deflecting means and disposed closely adjacent to the electron gun, a color grid disposed in the electron beam path closely spaced from the electron target and including a first set of grid wires in parallel alignment with the red phosphor strips and a second set of grid wires interleaved with the grid wires of said first set and in parallel alignment with the blue phosphor strips, an inductor terminating at one terminal thereof said first set of grid wires and terminating at the other terminal thereof said second set of grid wires and biased at the midpoint thereof to a voltage intermediate to the electron gun and the target electrode voltages, a sawtooth wave generator effective during the interval of each of the color information pulses for energizing said second deflecting means to deflect the electron beam in opposition to the horizontal scanning deflection of the beam and at the same rate in order to cause the electron beam to be directed approximately toward the axial center portion of each of the color strips, and a sine wave generator coupled to said inductor and biasing said first set of grid wires slightly positive with respect to said second set of grid wires during each interval one of the red color pulses of electrons intercepts said color grid and biasing said first and second sets of grid wires at substantially the same voltage during each interval one of the green color pulses of electrons intercepts said color grid and biasing said second set of grid wires slightly positive with respect to said first set of grid wires during each interval one of the blue color pulses of electrons intercepts said color grid in order to cause the electron beam to be further deflected and accurately focused onto the axial center portion of a red phosphor strip and of a green phosphor strip and of a blue phosphor strip of the electron target respectively during the corresponding color pulse intervals thereof, whereby the red and the green and the blue color modulated portions of the electron beam dwell and accurately register at the axial center portion respectively of a red and of a green and of a blue phosphor strip on the electron target to produce in composite an intense color picture display.

6. The color television combination set forth in claim 5, wherein said second deflecting means comprises a pair of electrostatic deflection plates.

7. A single gun color television picture display tube comprising an electron gun for emitting a beam of electrons, a picture display area composed of an electron target made up of a plurality of phosphor strips including strips of a first color and of a second color and of a third color arranged in a repeated color-sequence and adapted to be disposed vertically in use, first means for deflecting the beam to scan the target in a line raster wherein the electron beam traverses each of said phosphor strips during each line scan in a direction perpendicular to the longitudinal axis of said strips, means for modulating the electron beam with first color information pulses and second color information pulses and third color information pulses in a repeated color-sequence, second means for deflecting the electron beam separate and distinct from said first deflecting means and positioned adjacent to said electron gun effective upon the electron beam during the interval of each of the color information pulses in opposition to the horizontal scanning deflection of the beam during the interval in order to cause the electron beam to be directed approximately toward the axial center portion of each of the color strips during the corresponding color pulse intervals, a color grid disposed in the electron beam path adjacent to the electron target and including first color grid wires in alignment with said first color strips and third color grid wires in alignment with said third color strips, and means interconnecting said first color grid wires and providing a color connection therefor and separate means interconnecting said third color grid wires and providing a color voltage connection therefor.

8. A single gun color television picture display tube as set forth in claim 7, wherein the first color grid wires and the third color grid wires are interlaced and disposed perpendicularly and parallel to and in alignment with the first color strips and the third color strips, respectively.

9. A single gun color television picture display tube comprising an electron gun for emitting a beam of electrons, a picture display area composed of an electron target made up of a plurality of phosphor strips including strips of a first color and of a second color and of a third color arranged in a reversing color-sequence and adapted to be disposed vertically in use, first means for deflecting the beam to scan the target in a liner raster wherein the electron beam traverses each of said phosphor strips during each line scan in a direction perpendicular to the longitudinal axis of said strips and horizontally in use, means for modulating the electron beam with first color information pulses and second information pulses and third color information pulses in the reversing color-sequence, second means for deflecting the electron beam separate and distinct from said first deflecting means and positioned closely adjacent to said electron gun and disposed between said electron gun and said first deflecting means effective upon the electron beam during the interval of each of the color information pulses in opposition to the horizontal scanning deflection of the beam during the interval in order to cause the electron beam to be directed approximately toward the axial center portion of each of the color strips during the corresponding color pulse intervals, a color grid disposed in the electron beam path adjacent to and closely spaced from said electron target and including first color grid wires arranged vertically in parallel alignment with said first color strips and third color grid wires arranged in vertical parallel alignment with said third color strips, said first color grid wires being interlaced with said third color grid wires, and means interconnecting said first color grid wires and providing a common voltage connection therefor and separate means interconnecting said third grid wires and providing a common voltage connection therefor.

References Cited in the file of this patent

UNITED STATES PATENTS

| | | |
|---|---|---|
| 2,742,522 | Law | Apr. 17, 1956 |
| 2,744,952 | Lawrence | May 8, 1956 |
| 2,745,899 | Maher | May 15, 1956 |
| 2,759,993 | Loughlin | Aug. 21, 1956 |
| 2,763,715 | Fromm | Sept. 18, 1956 |
| 2,901,531 | McCoy et al. | Aug. 25, 1959 |

OTHER REFERENCES

"Compatible Color Picture Presentation with the Single Gun Tricolor Chromatron," Gow and Dorr, Proceedings of the I.R.E., vol. 42, #1, January 1954, pages 308–311.